US011462971B2

United States Patent
Malvasi et al.

(10) Patent No.: US 11,462,971 B2
(45) Date of Patent: Oct. 4, 2022

(54) ELECTRIC FLUID PUMP FOR A MOTOR VEHICLE

(71) Applicant: PIERBURG PUMP TECHNOLOGY GMBH, Neuss (DE)

(72) Inventors: Alessandro Malvasi, Leghorn (IT); Christian Schulz, Duisburg (DE); Frank Buerger, Langerwehe (DE); Martin Glogasa, Neuss (DE); Witold Joschko, Kempen (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 282 days.

(21) Appl. No.: 16/758,402

(22) PCT Filed: Oct. 25, 2017

(86) PCT No.: PCT/EP2017/077309
§ 371 (c)(1),
(2) Date: Apr. 23, 2020

(87) PCT Pub. No.: WO2019/081011
PCT Pub. Date: May 2, 2019

(65) Prior Publication Data
US 2020/0251965 A1    Aug. 6, 2020

(51) Int. Cl.
*H02K 11/00* (2016.01)
*H02K 11/215* (2016.01)
(Continued)

(52) U.S. Cl.
CPC ........... *H02K 11/215* (2016.01); *H02K 29/08* (2013.01); *H02K 1/276* (2013.01); *H02K 2211/03* (2013.01); *H02K 2213/03* (2013.01)

(58) Field of Classification Search
CPC ...... H02K 11/215; H02K 29/08; H02K 1/276; H02K 2211/03; H02K 2213/03; H02K 11/33
See application file for complete search history.

(56) References Cited

U.S. PATENT DOCUMENTS

| 5,864,192 A | 1/1999 | Nagate et al. |
| 2008/0174212 A1* | 7/2008 | Rudel ............ H02K 29/08 310/156.43 |
| 2019/0068015 A1 | 2/2019 | Yabe et al. |

FOREIGN PATENT DOCUMENTS

| EP | 1 146 625 A2 | 10/2001 |
| EP | 2 552 000 A2 | 1/2013 |

(Continued)

*Primary Examiner* — Thomas Truong
(74) *Attorney, Agent, or Firm* — Norman B. Thot

(57) ABSTRACT

An electric fluid pump for a motor vehicle includes an electric drive motor which is brushless and electronically commutated. The electric drive motor includes a permanent-magnetic motor rotor having a motor shaft and at least two rotor poles, each of the at least two rotor poles having one permanent magnet embedded therein, a plurality of stator-side magnetic coils, at least two sensor magnets each emitting an axial magnetic field and each having polarities, and at least one Hall sensor which is arranged to lie eccentrically in a transverse plane so that the at least one Hall sensor detects the axial magnetic fields of the at least two sensor magnets. The at least two sensor magnets are magnetized diametrically. The at least one Hall sensor is arranged to detect the polarities of each of the at least two sensor magnets during one revolution of the permanent-magnetic motor rotor.

9 Claims, 2 Drawing Sheets

(51) Int. Cl.
    *H02K 29/08*     (2006.01)
    *H02K 1/276*     (2022.01)

(56) References Cited

FOREIGN PATENT DOCUMENTS

| | | |
|---|---|---|
| EP | 2 701 291 A1 | 2/2014 |
| JP | H01-186151 A | 7/1989 |
| JP | 2001-128417 A | 5/2001 |
| JP | 2007-221976 A | 8/2007 |
| JP | 2012-205355 A | 10/2012 |
| JP | 2013-81326 A | 5/2013 |
| JP | 2013-220000 A | 10/2013 |
| JP | 2015-12782 A | 1/2015 |
| JP | 2015-91139 A | 5/2015 |
| JP | WO2013/114432 A1 | 5/2015 |
| JP | 2016-52199 A | 4/2016 |
| WO | WO 2017/033239 A1 | 3/2018 |

\* cited by examiner

ELECTRIC FLUID PUMP FOR A MOTOR VEHICLE

CROSS REFERENCE TO PRIOR APPLICATIONS

This application is a U.S. National Phase application under 35 U.S.C. § 371 of International Application No. PCT/EP2017/077309, filed on Oct. 25, 2017. The International Application was published in German on May 2, 2019 as WO 2019/081011 A1 under PCT Article 21(2).

FIELD

The present invention relates to an electric fluid pump for a motor vehicle, having an electric drive motor which is brushless and electronically commutated, wherein the drive motor has a permanent-magnet motor rotor having a motor shaft and having at least two rotor poles, in each of which a permanent magnet is embedded, a plurality of stator-side magnetic coils, at least two sensor magnets, and at least one Hall sensor which is arranged to lie eccentrically in a transverse plane so that it detects the axial magnetic fields of the sensor magnets.

BACKGROUND

For the safest and most energy efficient operation of a motor vehicle fluid pump which is driven by an electronically commutated drive motor, an exact detection of the rotational rotor position of the motor rotor is of great importance since an exact control and regulation of the drive motor can only thereby be achieved. Undesired operational states, for example, start-up problems, so-called toggling etc., can here be avoided which may in particular occur in positive displacement fluid pumps due to largely varying torques. Absolute energy consumption is also minimized by an exact termination of the reversal of current in the stator-side magnetic coils.

Hall sensors are therefore used for an exact detection of the rotor position, the Hall sensors thereby being arranged axially with respect to the permanent-magnetically excited motor rotor, for example, on the radius of the rotor poles, to thereby detect the rotating magnetic fields by which are generated by the rotor poles. The decisive factors for the exactness of the rotor position detection via Hall sensors are the absolute field strength of the magnetic field of the rotor poles detected by the respective Hall sensor, as well as the magnitude of interference signals.

EP 1 146 625 A2 describes an electric hydraulic pump for motor vehicles comprising a brushless and electronically commutated drive motor which has a permanent-magnetic motor rotor with a plurality of rotor poles. Position detection is effected by a plurality of Hall sensors on the end face which radially detect the permanent magnetic field generated by the permanent-magnetic motor rotor.

SUMMARY

An aspect of the present invention is to provide a fluid pump for a motor vehicle with an electronically commutated drive motor which provides for high operational reliability and energy efficiency, while incurring low manufacturing costs.

In an embodiment, the present invention provides an electric fluid pump for a motor vehicle which includes an electric drive motor which is brushless and electronically commutated. The electric drive motor comprises a permanent-magnetic motor rotor comprising a motor shaft and at least two rotor poles, each of the at least two rotor poles comprising one permanent magnet embedded therein, a plurality of stator-side magnetic coils, at least two sensor magnets each of which emit an axial magnetic field and each of which have polarities, and at least one Hall sensor which is arranged to lie eccentrically in a transverse plane so that the at least one Hall sensor detects the axial magnetic fields of the at least two sensor magnets. The at least two sensor magnets are magnetized diametrically. The at least one Hall sensor is arranged to detect the polarities of each of the at least two sensor magnets.

BRIEF DESCRIPTION OF THE DRAWINGS

The present invention is described in greater detail below on the basis of embodiments and of the drawings in which.

DETAILED DESCRIPTION

Figure 1:
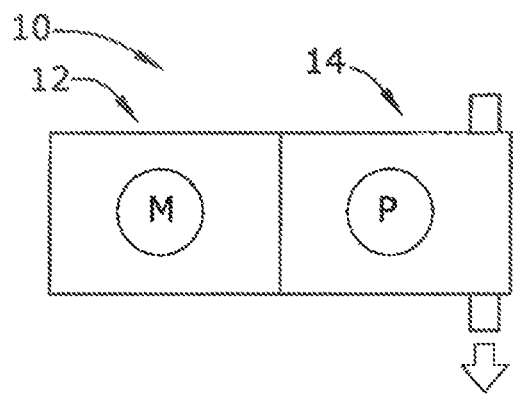
FIG. 1 is a schematic illustration of an electric fluid pump for a motor vehicle with an electric drive motor and a pump module.

The fluid pump for a motor vehicle of the present invention comprises a brushless and electrically commutated drive motor, wherein the permanent-magnetically excited motor rotor comprises a plurality of rotor poles and a plurality of stator-side magnetic coils. At least one Hall sensor is provided for rotor position detection, the at least one Hall sensor being arranged in a transversal plane with respect to the axial line of the motor. The at least one Hall sensor is arranged at a distance from the axial line of the motor so that the at least one Hall sensor senses the passing axial magnetic fields of the rotating sensor magnets. The particular arrangement of the at least one Hall sensor per sensor magnet makes it possible to sense three switching states instead of one switching state, using one Hall sensor. The resolution of the rotor position detection is thereby significantly increased.

The at least one Hall sensor can, for example, be arranged within a radius r from the rotary axis of the motor shaft, the radius r being greater than/equal to a distance $r_{min}$ from the rotary axis to a center of a sensor magnet and smaller than/equal to a distance $r_{max}$ from the rotary axis to a point of a sensor magnet having the maximum distance from the rotary axis. The at least one hall sensor is thereby arranged so that each sensor magnet detects both polarities (N, S) during one revolution.

In an embodiment of the present invention, the at least two sensor magnets can, for example, be formed by the permanent magnets embedded in the rotor poles. No additional elements are thereby required to detect the rotor position.

The at least two sensor magnets can alternatively be formed by permanent magnets fixed to the rotor poles. The magnetic field detectable by the Hall sensor can thereby be amplified, so that the signal-to-noise ratio is improved. Besides the permanent magnets embedded in the rotor poles of the motor rotor, additional permanent magnets are thus provided as sensor magnets.

In an embodiment of the present invention, the sensor magnets can, for example, have a rectangular shape.

A printed circuit board lying in a transversal plane can, for example, be provided on which all Hall sensors are arranged. The printed circuit board may also accommodate both the control electronics and the power electronics of the motor control. The Hall sensors are thus not arranged at a distance from the circuit board with the control and power electronics. The signal paths between the Hall sensor and the control electronics are thus short.

In an embodiment of the present invention, the Hall sensors can, for example, be provided on the proximal side of the printed circuit board directed towards the motor rotor. The Hall sensors are thus arranged axially between the printed circuit board and the motor rotor, i.e., they are positioned at a distance that is spatially as short as possible.

The printed circuit board may comprise a motor shaft opening through which the motor shaft of the motor rotor protrudes.

The printed circuit board can, for example, be cast in a plastic cast body. The printed circuit board including all Hall sensors and electronic components is thereby well shielded against mechanical and other interferences. Casting the printed circuit board has further advantages since the cooling of the electronic components and in particular of the power electronics or semiconductors is thereby generally improved. Since the improvement of the magnetic connection between the Hall sensors and the rotor poles further causes an improvement in control accuracy, and the electric energy supplied into the drive motor is thereby reduced, the thermal power loss is also reduced, in particular that of the power semiconductors.

Two embodiments of the present invention will be explained in greater detail below under reference to the accompanying drawings.

FIG. 1 schematically illustrates an electric fluid pump 10 for a motor vehicle which is formed by two modules, i.e., an electric drive motor 12 and a pump module 14. The pump module 14 may be a positive displacement pump, for example, a membrane pump, a rotary vane pump, a vane pump or a piston pump, but may also be a flow pump, for example, a centrifugal or impeller pump.

Figure 2:
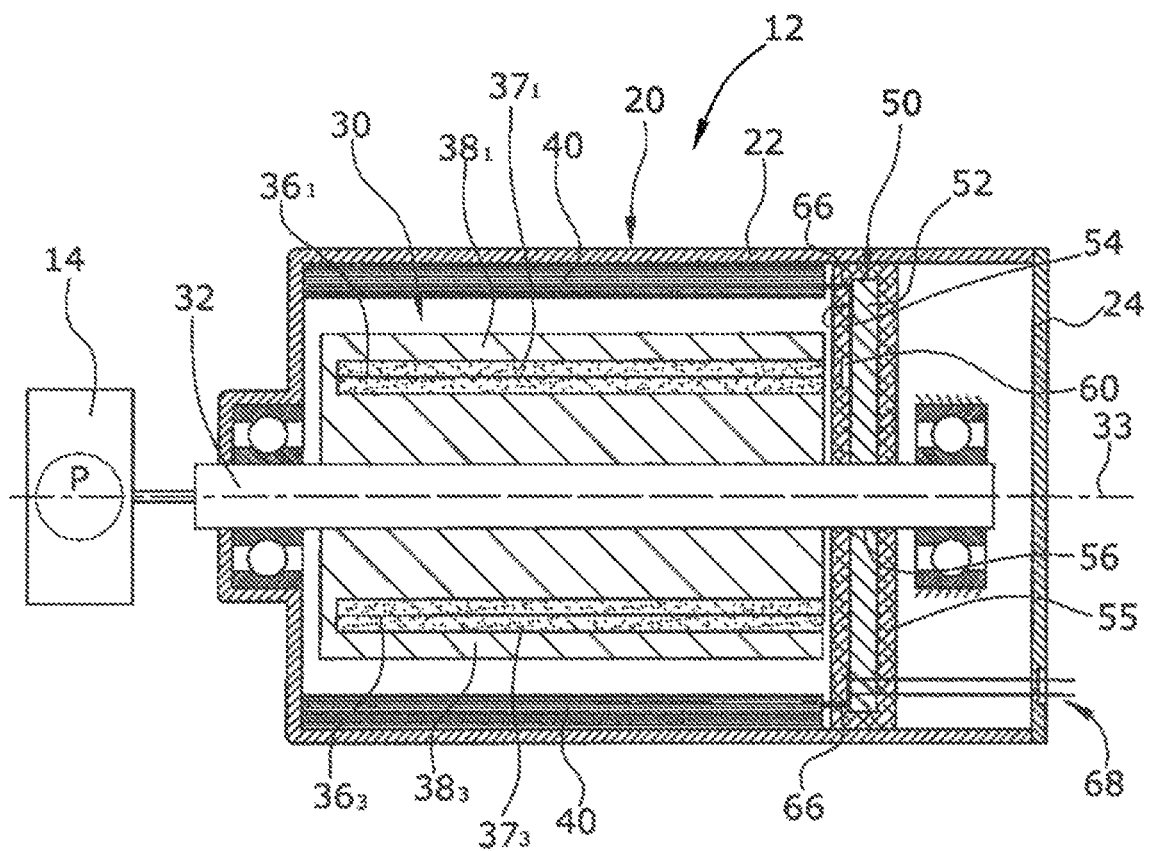
FIG. 2 is a longitudinal section of the drive motor of the fluid pump for a motor vehicle in FIG. 1.

FIG. 2 illustrates the electric drive motor 12 in longitudinal section. The electric drive motor 12 is a brushless and electronically commutated drive motor. The electric drive motor 12 comprises a permanent-magnetically excited motor rotor 30 with four rotor poles $38_1$, $38_2$, $38_3$, $38_4$, in each of which a diametrically magnetizable permanent magnet $36_1$, $36_2$, $36_3$, $36_4$ is embedded.

Six magnetic coils $40_1$-$40_6$ are provided on the stator side which generate a circumferentially extending stator magnetic field. The six magnetic coils $40_1$-$40_6$ are fixed in a motor housing 20 formed by a housing cup 22 and a housing cover 24. The motor rotor 30 comprises a motor shaft 32 with a rotary axis 33 which drives a pump shaft of the pump module 14.

A printed circuit board 50 lying in a transversal plane is provided at the opposite longitudinal end averted from the pump module 14, the printed circuit board 50 comprises a circuit board body 52 with conductor paths 54 on its proximal side. The proximal side of the circuit board body 52 is the side directed to the motor rotor 30 in the axial direction, whereas the side averted from the motor rotor 30 in the axial direction is the distal side. The printed circuit board 50 has a motor shaft opening 56 through which the motor shaft 32 protrudes. Both the control electronics and the power electronics of the motor control are arranged on the proximal side of the circuit card body 52. A Hall sensor 60 is also arranged on the proximal side of the circuit board body 52. The Hall sensor 60 detects the magnetic fields generated by the sensor magnets which are formed by the permanent magnets $36_1$-$36_4$ embedded in the rotor poles $38_1$-$38_4$. The derivation of the position of this Hall sensor 60 will be provided in the course of the description of FIG. 3.

The power electronics of the printed circuit board 50 is electrically connected with the magnetic coils 40 via the conductor paths 54 and via axial connection lines 66. The printed circuit board 50 is arranged axially so that the Hall sensor 60 is at the smallest possible distance from the axially opposite end face of the motor rotor 30.

The entire printed circuit board 50 including the control electronics, the power electronics, and the Hall sensor 60, as well as the axial connection lines 66, are cast in a monolithic plastic cast body 55. The conductor paths 54 of the printed circuit board 50 are connected to a motor plug 68 via the axial connection lines 66.

Figure 3:
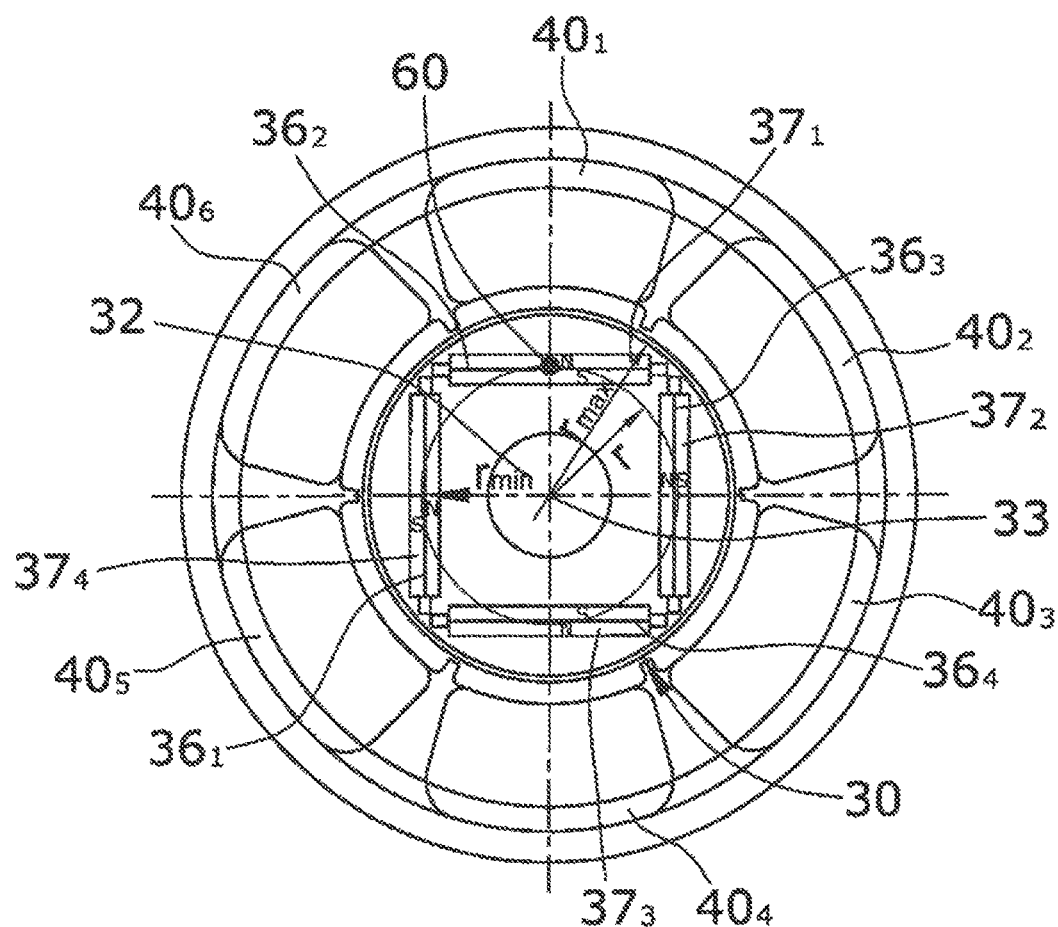
FIG. 3 is a cross section of the drive motor of the fluid pump for a motor vehicle of FIG. 1.

FIG. 3 illustrates a section in the transverse direction of the electric drive motor 12 of the electric fluid pump 10 for a motor vehicle. Components previously described are thereby identified using the same reference numerals. In this sectional view, the Hall sensor 60 is not visible, however, in an effort to clarify the present invention, the position of the Hall sensor 60 is illustrated by its reference numeral. The Hall sensor 60 is here arranged at a radius r from the rotary axis 33 of the motor shaft 32. The position of the Hall sensor 60 is chosen so that the circle described by the radius r passes through a respective outward directed polarity region $37_1$, $37_2$, $37_3$, $37_4$ in the region of the cross section center of the sensor magnets $36_1$-$36_4$. By this arrangement, the Hall sensor 60 can detect both polarities (N, S) of each sensor magnet $36_1$-$36_4$ during one revolution of the motor rotor 30 and can thus detect three switching states per sensor magnet $36_1$-$36_4$.

The present invention is not limited to embodiments described herein; reference should be had to the appended claims.

What is claimed is:

1. An electric fluid pump for a motor vehicle, the electric fluid pump comprising an electric drive motor which is brushless and electronically commutated, the electric drive motor comprising:
   a permanent-magnetic motor rotor comprising a motor shaft and at least two rotor poles, each of the at least two rotor poles comprising one permanent magnet embedded therein;
   a plurality of stator-side magnetic coils;
   at least two sensor magnets each of which emit an axial magnetic field and each of which have polarities; and
   at least one Hall sensor which is arranged to lie eccentrically in a transverse plane so that the at least one Hall sensor detects the axial magnetic fields of the at least two sensor magnets,
   wherein,
   the at least two sensor magnets are magnetized diametrically, and
   the at least one Hall sensor is arranged to detect the polarities of each of the at least two sensor magnets during one revolution of the permanent-magnetic motor.

2. The electric fluid pump as recited in claim 1, wherein, the motor shaft comprises a rotary axis,
   the at least one Hall sensor is arranged at a radius r from the rotary axis of the motor shaft, and
   the radius r is greater ≥ to a distance $r_{min}$ from the rotary axis to a center of each of the at least two sensor magnets and ≤ a distance $r_{max}$ from the rotary axis to a point of each of the at least two sensor magnets having a maximum distance from the rotary axis.

3. The electric fluid pump as recited in claim 1, wherein each of the at least two sensor magnets are formed by the permanent magnets embedded in the at least two rotor poles.

4. The electric fluid pump as recited in claim 1, wherein,
the electric drive motor further comprises a permanent magnet mounted on each of the at least two rotor poles, and
each of the at least two sensor magnets are formed by the permanent magnet mounted on each of the at least two rotor poles.

5. The electric fluid pump as recited in claim 1, wherein the at least two sensor magnets have a rectangular shape.

6. The electric fluid pump as recited in claim 1, wherein,
the electric drive motor further comprises a printed circuit board lying in a transversal plane, and
the at least one Hall sensor is arranged on the printed circuit board.

7. The electric fluid pump as recited in claim 6, wherein,
the printed circuit board comprises a proximal side which is directed towards the motor rotor in an axial direction, and
the at least one Hall sensor is arranged on the proximal side of the printed circuit board.

8. The electric fluid pump as recited in claim 6, wherein,
the electric drive motor further comprises a motor shaft, and
the printed circuit board comprises a motor shaft opening through which the motor shaft protrudes.

9. The electric fluid pump as recited in claim 6, wherein the printed circuit board is cast in a plastic cast body.

\* \* \* \* \*